(12) United States Patent
Mekuria et al.

(10) Patent No.: US 6,424,822 B1
(45) Date of Patent: Jul. 23, 2002

(54) COMMUNICATION DEVICE AND METHOD OF OPERATION

(75) Inventors: Fisseha Mekuria, Lund; Hans Cavander, Staffenstorp; Per Ljungberg, Lund, all of (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/267,277

(22) Filed: Mar. 12, 1999

(30) Foreign Application Priority Data

Mar. 13, 1998 (SE) .............................................. 9800831

(51) Int. Cl.[7] .............................................. H04B 7/00
(52) U.S. Cl. ......................... 455/72; 455/79; 455/550; 375/240; 375/241; 704/201; 704/501
(58) Field of Search .......................... 455/72, 79, 550, 455/425, 285, 302, 78; 375/240, 241, 242, 216, 259, 262; 704/201, 501

(56) References Cited

U.S. PATENT DOCUMENTS

| | | | |
|---|---|---|---|
| 5,105,197 A | | 4/1992 | Clagett ........................ 342/419 |
| 5,258,983 A | * | 11/1993 | Lane et al. ..................... 455/72 |
| 5,363,311 A | * | 11/1994 | Garbo et al. ................... 455/72 |
| 5,452,356 A | * | 9/1995 | Albert ........................... 455/72 |
| 5,469,223 A | * | 11/1995 | Kimura .......................... 455/72 |
| 5,493,698 A | * | 2/1996 | Suzuki et al. .................. 455/72 |
| 5,499,286 A | | 3/1996 | Kobayashi .................... 379/58 |
| 5,630,205 A | | 5/1997 | Ekelund ....................... 455/54.1 |
| 5,675,333 A | | 10/1997 | Boursier et al. ................ 341/87 |
| 6,192,259 B1 | * | 12/1997 | Hayashi ....................... 455/575 |
| 5,784,006 A | * | 7/1998 | Hochstein .................... 455/72 |
| 5,864,766 A | * | 1/1999 | Chiang ........................ 455/90 |
| 5,867,627 A | * | 2/1999 | Nakazato et al. ........... 386/112 |
| 5,881,104 A | * | 3/1999 | Akahane ..................... 375/240 |

FOREIGN PATENT DOCUMENTS

| | | |
|---|---|---|
| EP | 0 700 192 A1 | 3/1996 |
| EP | 0 725 499 A1 | 8/1996 |
| EP | 0 762 711 A2 | 3/1997 |
| JP | 08167598 | 1/1998 |
| WO | WO 95/34984 | 12/1995 |
| WO | WO 96/19069 | 6/1996 |

OTHER PUBLICATIONS

Thomas M. Cover, Joy A. Thomas, *Elements of Information Theory*, Published 1991 in U.S. and Canada, John Wiley & Sons, Inc., pp. 92–94; 319–326.

* cited by examiner

*Primary Examiner*—William Trost
*Assistant Examiner*—Simon Nguyen
(74) *Attorney, Agent, or Firm*—Jenkens & Gilchrist, P.C.

(57) ABSTRACT

A communication device is provided having a speech encoder and a speech decoder and being able to retrieve and store voice messages in a memory. The messages are stored in the memory according to a message format. This format is more compressed than the speech encoding format which is provided by the speech encoder. The device includes a frame interpolation block for decompressing a stored message and thereby creating a signal according to the speech encoding format. A frame decimation block is also provided for compressing a speech encoded signal thereby allowing a corresponding voice message to be stored in the memory according to the message format.

36 Claims, 4 Drawing Sheets

COMMUNICATION DEVICE AND METHOD OF OPERATION

TECHNICAL FIELD OF INVENTION

The invention relates to communication devices and, in particular, to communication devices being able to read-out and, possibly, store voice messages in a memory. The invention also relates to methods for retrieving and, possibly, storing voice messages in such devices.

DESCRIPTION OF RELATED ART

A communication device adapted to receiving and transmitting audio signals is often equipped with a speech encoder and a speech decoder. The purpose of the encoder is to compress an audio signal which has been picked-up by a microphone. The speech encoder provides a signal in accordance with a speech encoding format. By compressing the audio signal the bandwidth of the signal is reduced and, consequently, the bandwidth requirement of a transmission channel for transmitting the signal is also reduced. The speech decoder performs substantially the inverse function of the speech encoder. A received signal, coded in the speech encoding format, is passed through the speech decoder and an audio signal, which is later outputted by a loudspeaker, is thereby recreated.

One known form of a communication device being able to read-out and store voice messages in a memory is discussed in the U.S. Pat. No. 5,499,286 by Kobayashi. A voice message is stored in the memory as data coded in the speech encoding format. The speech decoder of the communication device is used to decode the stored data and thereby recreating an audio signal of the stored voice message. Likewise, the speech encoder is used to encode a voice message, picked up by the microphone, and thereby providing data coded in the speech encoding format. This data is then stored in the memory as a representation of the voice message.

The U.S. Pat. No. 5,630,205 by Ekelund illustrates a similar design.

Whilst the known communication device described above functions quite adequately, it does have a number of disadvantages.

A drawback of the known communication device is that although the speech encoder and speech decoder allow message data to be stored in a memory in a relatively compressed format, a large memory is still needed. Memory is expensive and is often, especially in small hand-held communication devices, such as cellular phones or mobile phones, a scarce resource.

An example of a speech encoding/decoding algorithm is defined in the GSM (Global System for Mobile communications) standard where a residual pulse excited long term prediction, RPE-LTP coding algorithm is used. This algorithm, which is referred to as a full-rate speech coder algorithm, provides a compressed data rate of about 13 kbit/s. The memory requirement for storing voice messages is thereby relatively high. The computational power needed for performing the full-rate speech coding algorithm is, however, relatively low (about 2 MIPS). The GSM standard also includes a half-rate speech coder algorithm which provides a compressed data rate of about 5.6 kbit/s. Although this means that the memory requirement for storing voice messages is lower than what is required when the full-rate speech coding algorithm is used, the half-rate speech code algorithm does require a lot of computational power (about 16 MIPS). Computational power is expensive to implement and is often, especially in small hand-held communication devices, such as cellular phones or mobile phones, a scarce resource. Furthermore, a circuit for carrying out a high degree of computational power also consumes a lot of electrical power, which adversely affect the battery life-length in battery powered communication devices.

It is an object of the present invention to provide a communication device which overcomes or alleviates the above mentioned problems.

The invention is also directed to a method by which the described device operates.

SUMMARY

According to an aspect of the present invention there is provided a communication device comprising a microphone for receiving an acoustic voice signal thereby generating a voice signal, a speech encoder adapted to encoding the voice signal according to a speech encoding algorithm, the voice signal thereby being coded in a speech encoding format, a transmitter for transmitting the encoded voice signal, a receiver for receiving a transmitted encoded voice signal, the received encoded voice signal being coded in the speech encoding format, a speech decoder for decoding the received encoded voice signal according to a speech decoding algorithm, a loudspeaker for outputting the decoded voice signal, a memory for holding message data corresponding to at least one stored voice message, memory read out means for reading out message data corresponding to a voice message from the memory and code decompression means for decompressing read out message data from a message data format to the speech encoding format.

According to another aspect of the present invention there is provided a voice message retrieval method comprising the steps of reading out message data coded in a message data format from the memory, decompressing the read out message data to the speech encoding format by means of a decompression algorithm, decoding the decompressed message data according to the speech decoding algorithm, and passing the decoded message data to the loudspeaker for outputting the voice message as an acoustic voice signal.

According to another aspect of the present invention there is provided a voice message retrieval method comprising the steps of reading out message data coded in a message data format from the memory, decompressing the read out message data to the speech encoding format by means of a decompression algorithm and passing the decompressed message data to the transmitter for transmitting the voice message from the communication device.

This construction and methods achieve the advantage that a voice message is stored in the memory in a more compressed format than the format provided by a speech encoder. Such a stored voice message is decompressed by the decompression means thereby recreating an encoded voice signal coded in the speech encoding format, i.e. the format provided after a voice signal has passed a speech encoder.

Preferably the communication device further comprises code compression means for compressing an encoded voice signal coded in the speech encoding format thereby generating message data coded in the message data format and memory write means for storing the compressed message data in the memory as a stored voice message.

According to another aspect of the present invention there is provided a voice message storage method comprising the steps of converting an acoustic voice signal to a voice signal by means of a microphone, encoding the voice signal by means of the speech encoding algorithm thereby generating an encoded voice signal coded in the speech encoding format, compressing the encoded voice signal according to a compression algorithm thereby generating message data coded in the message data format and storing the compressed message data in the memory as a stored voice message.

According to another aspect of the present invention there is provided a voice message storage method comprising the steps of receiving a transmitted encoded voice signal coded in the speech encoding format, compressing the received encoded voice signal according to a compression algorithm thereby generating message data coded in the message data format and storing the compressed message data in the memory as a stored voice message.

This construction and methods achieve the advantage that a user can store a voice message in the memory in a more compressed format compared to the speech encoding format.

Since a voice message is stored in the memory in a more compressed format than the format provided by a speech encoder, as is the case in the prior art, less memory is required to store a particular voice message. A smaller memory can therefore be used. Alternatively, a longer voice message can be stored in a particular memory. Consequently the communication device of the present invention requires less memory and, hence, is cheaper to implement. In, for example, small hand-held communication devices, where memory is a scarce resource, the smaller amount of memory required provides obvious advantages. Furthermore, a small amount of computational power is required due to the fact that simple decompression algorithms can be used by the decompression means.

DETAILED DESCRIPTION OF EMBODIMENTS

Embodiments of the present invention are described below, by way of example only. The block diagrams illustrate functional blocks and their principle interconnections and should not be mistaken for illustrating specific implementations of the present invention.

Figure 1:
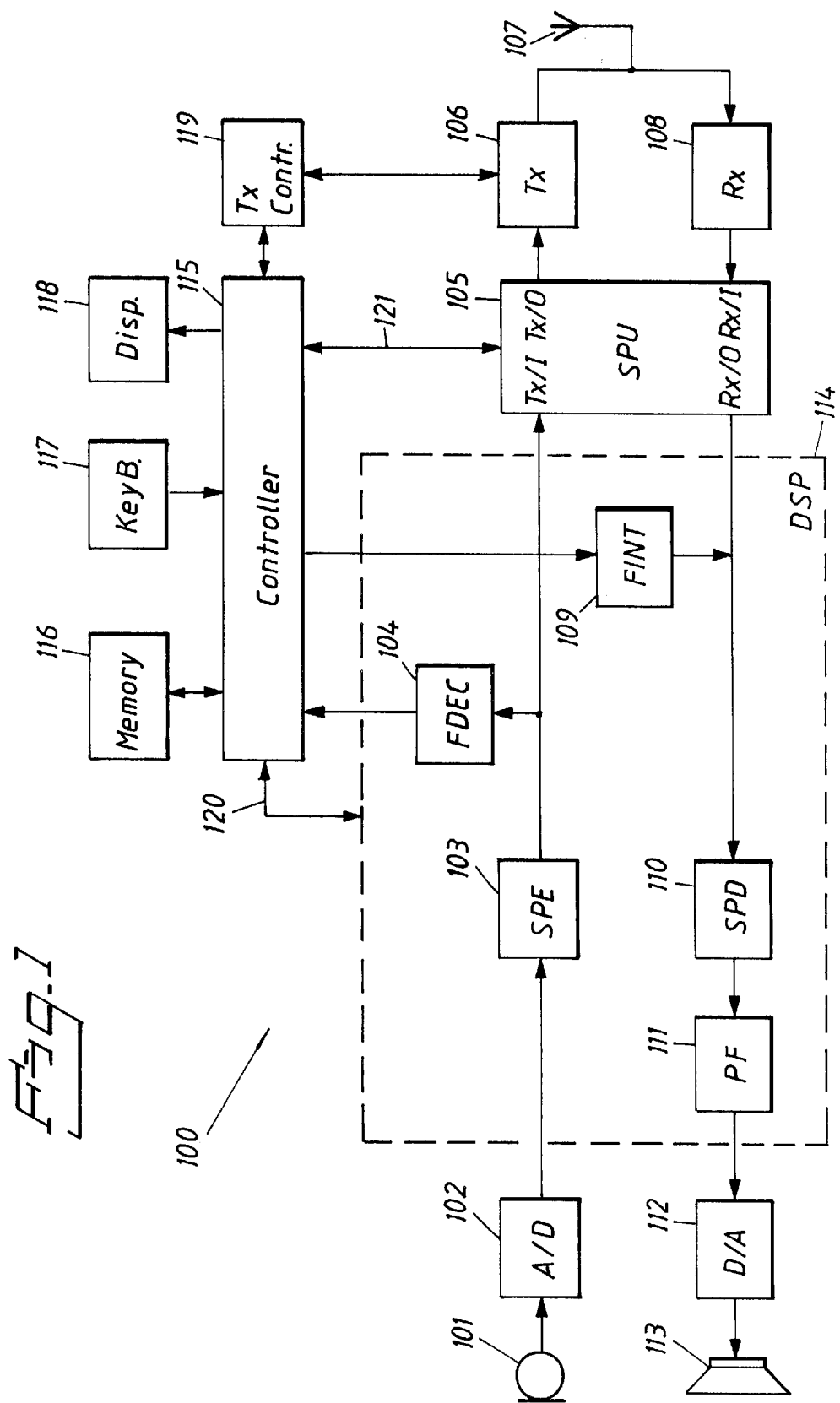
FIG. 1 illustrates an exemplary block diagram of a communication device in accordance with a first embodiment of the present invention.

FIG. 1 illustrates an exemplary block diagram of a communication device 100 in accordance with a first embodiment of the present invention. A microphone 101 is connected to an input of an analog-to-digital, A/D, converter 102. The output of the A/D converter is connected to an input of a speech encoder, SPE, 103. The output of the speech encoder is connected to the input of a frame decimation block, FDEC, 104 and to a transmitter input, Tx/I, of a signal processing unit, SPU, 105. A transmitter output, Tx/0, of the signal processing unit is connected to a transmitter, Tx, 106, and the output of the transmitter is connected to an antenna, 107, constituting a radio air interface. The antenna is also connected to the input of a receiver, Rx, 108, and the output of the receiver is connected to a receiver input, Rx/I, of the signal processing unit 105. A receiver output Rx/O of the signal processing unit 105 is connected to an input of a speech decoder, SPD, 110. The input of the speech decoder 110 is also connected to an output of a frame interpolation block, FINT, 109. The output of the speech decoder is connected to an input of a post-filtering block, PF, 111. The output of the post-filtering block is connected to an input of a digital-to-analog, D/A, converter, 112. The output of the D/A converter is connected to a loudspeaker 113. Preferably, the SPE, FDEC, FINT, SPD and PF are implemented by means of a digital signal processor, DSP, 114 as is illustrated by the broken line in FIG. 1. If a high degree of integration is desired, the A/D converter, the D/A converter and the SPU may also be implemented by means of the DSP. It should be understood that the elements implemented by means of the DSP may be realized as software routines run by the DSP. However, it would be equally possible to implement these elements by means of hardware solutions. The methods of choosing the actual implementation is well known in the art. The output of the frame decimation block 104 is connected to a controller 115. The controller also being connected to a memory 116, a keyboard 117, a display 118 and a transmit controller, Tx Contr, 119, the latter being connected to a control input of the transmitter, 106. The controller also controls the operation of the digital signal processor 114 illustrated by the connection 120 and the operation of the signal processing unit 105 illustrated by the connection 121 in FIG. 1.

In operation the microphone 101 picks-up an acoustic voice signal and generates thereby a voice signal which is fed to and digitized by the A/D converter 102. The digitized signal is forwarded to the speech encoder 103 which encodes the signal according to a speech encoding algorithm. The signal is thereby compressed and an encoded voice signal is generated. The encoded voice signal is set in a pre-determined speech encoding format. By compressing the signal the bandwidth of the signal is reduced and, consequently, the bandwidth requirement of a transmission channel for transmitting the signal is also reduced. For example, in the GSM (Global System for Mobile communications) standard a residual pulse excited long term prediction, RPE-LTP coding algorithm is used. This algorithm, which is referred to as a full-rate speech coder algorithm, provides a compressed data rate of about 13 kbit/s and is more fully described in the GSM Recommendation 6.10 entitled "GSM Full Rate Speech Transcoding" which description is hereby incorporated by reference. The GSM standard also includes a half-rate speech coder algorithm which provides a compressed data rate of about 5.6 kbit/s. Another example is the vector sum excited linear prediction, VLSELP, coding algorithm which is used in the D-AMPS (Digital-Advanced Mobile Phone Systems) standard. It should be understood that the algorithm used by the speech encoder is not crucial to the present invention. Furthermore, the access method used by the communication system is not crucial to the present invention. Examples of access methods that may be used are CDMA (Code Division Multiple Access), TDMA (Time Division Multiple Access) and FDMA (Frequency Division Multiple Access).

The encoded voice signal is fed to the signal processing unit 105 where it is further processed before being transmitted as a radio signal by means of the transmitter 106 and the antenna 107. Certain parameters of the transmitter are controlled by the transmit controller 119, e.g. the transmission power. The transmit controller 119 is under the control of the controller 115. The communication device may also receive a radio transmitted encoded voice signal by means of the antenna 107 and the receiver 108. The signal from the receiver 108 is fed to the signal processing unit 105 for processing and a received encoded voice signal is thereby generated. The received encoded voice signal is coded in the pre-determined speech encoding format mentioned above. The signal processing unit 105 includes, for example, circuitry for digitizing the signal from the receiver, channel coding, channel decoding and interleaving. The received encoded voice signal is decoded by the speech decoder 110 according to a speech decoding algorithm and a decoded voice signal is generated. The speech decoding algorithm represents substantially the inverse to the speech encoding algorithm of the speech encoder 103. In this case the post-filtering block is disabled and the decoded voice signal is outputted by means of the loudspeaker 113 after being converted to an analog signal by means of the D/A converter 112. The communication device comprises also a keyboard, KeyB, 117 and display, Disp, 118 for allowing a user to give commands to and receive information from the device.

In the case where the user wants to store a voice message in the memory 116 the user gives a command to the controller by pressing a pre-defined key or key-sequence at the keyboard 117 possibly guided by a menu system presented on the display 118. A voice message to be stored is then picked up by the microphone 101 and a digitized voice signal is generated by the A/D converter 102. The voice signal is encoded by the speech encoder 103 according to the speech encoding algorithm and an encoded voice signal having the pre-defined speech encoding format is provided. The encoded voice signal is inputted to the frame decimation block 104 where the signal is processed according to a compression algorithm and message data, coded in a pre-determined message data format, is generated. The message data is inputted to the controller 115 which stores the voice message by writing the message data into the memory 116.

Two compression algorithms will be discussed as examples of compression algorithms. The encoded voice signal may be considered to comprise a number of data frames, each data frame comprising a pre-determined number of bits. In many systems the concept of data frames and the number of bits per data frame is defined in the communication standard. A first compression algorithm eliminates i data frames out of j data frames where i an j are integers and j is greater than i. For example, every second data frame may be eliminated. A second compression algorithm makes use of the fact that in several systems the bits of a data frame is separated into at least two sets of data corresponding to pre-defined priority levels. For example, in the GSM system using the full-rate speech coder algorithm a data frame is defined as comprising 260 bits of which 182 are considered to be crucial (highest priority level) and 78 bits are considered to be non-crucial (lowest priority level). The crucial bits are normally protected by a high level of redundancy during radio transmission. Statistically the crucial bits will therefore be more insensitive to radio disturbances compared to the non-crucial bits. The second compression algorithm eliminates the bits of the data frame corresponding to the data set having the lowest priority level, i.e. the non-crucial bits. In the case where the data frame is defined to comprise more than two sets of data corresponding to more than two priority levels, the compression algorithm may eliminate a number of the sets of data corresponding to the lowest priority levels.

Although information is lost due to the compression algorithms discussed above, it is normally possible to reconstruct the signal sufficiently well, by the use of a decompression algorithm, to achieve a reasonable quality of the voice message when it is replayed. Decompression algorithms are discussed below.

Figure 2:
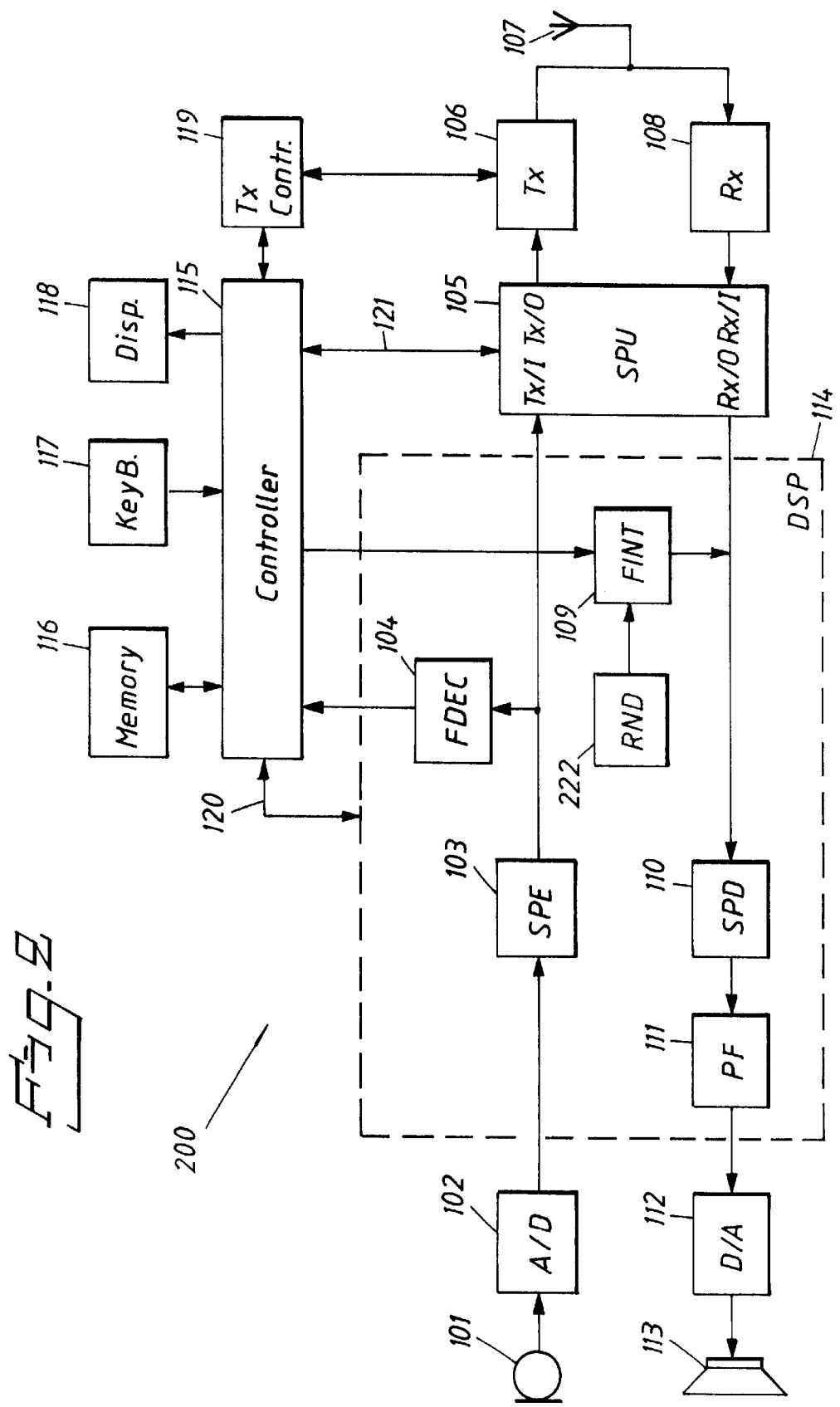
FIG. 2 illustrates an exemplary block diagram of a communication device in accordance with a second embodiment of the present invention.

In the case where the user wants to retrieve a voice message stored in the memory 116 the user gives a command to the controller by pressing a pre-defined key or key-sequence at the keyboard 117. Message data corresponding to a selected voice message is then read out by the controller 115 and forwarded to the frame interpolation block 109. The decompression algorithm of the frame interpolation block performs substantially the inverse function to the compression algorithm of the frame decimation block. If message data has been compressed using the first compression algorithm discussed above where i data frames out of j data frames have been eliminated the corresponding decompression algorithm may reconstruct the eliminated frames by means of an interpolation algorithm, e.g. linear interpolation. Message data compressed according to the second compression algorithm where the bits corresponding to the set of data having the lowest priority level have been eliminated the corresponding decompression algorithm may replace the eliminated bits by any pre-selected bit pattern. Preferably, however, the eliminated bits are replaced by an random code sequence. The random code sequence may either be generated by a random code generator or taken from a stored list of (pseudo-random) sequences. The use of a random code generator is illustrated in FIG. 2 which illustrates a block diagram of a communication device 200 in accordance with a second embodiment of the present invention. The second embodiment differs from the first embodiment in that the random code generator, RND, 222 is connected to the frame interpolation block 109. A random code sequence is thereby provided to the frame interpolation block 109.

Figure 3:
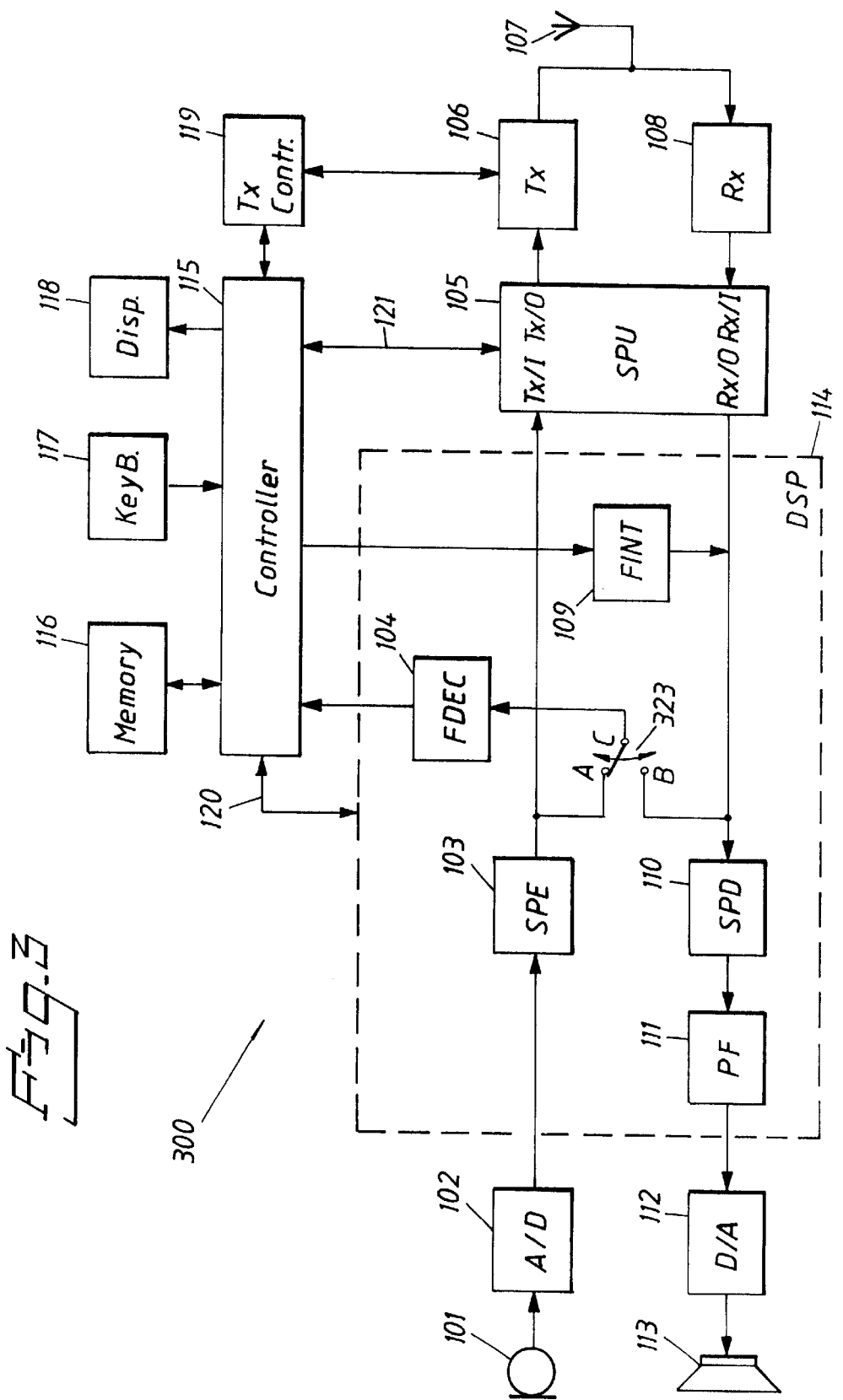
FIG. 3 illustrates an exemplary block diagram of a communication device in accordance with a third embodiment of the present invention.

FIG. 3 illustrates an exemplary block diagram of a communication device 300 in accordance with a third embodiment of the present invention. The third embodiment of the present invention differs from the first embodiment discussed above in that a switch 323 is introduced having a first terminal, A, connected to the output of the speech encoder 103, a second terminal, B, connected to the input of the speech decoder 110 and a common terminal, C, connected to the input of the frame decimation block 104. The switch may either connect terminal A or terminal B to terminal C upon control by the controller 115.

The operation of the third embodiment is identical to the operation of the first embodiment when the switch 323 connects the output of the speech encoder 103 to the input of the frame decimation block 104 (terminal A connected to terminal C). However, when the switch 323 is connecting the input of the speech decoder 110 to the input of the frame decimation block 104 (terminal B connected to terminal C) the user has the possibility to store a voice message which is received by the receiver 108. In this case the encoded voice signal appearing on the input of the speech decoder 110 also appears on the input of the frame decimation block 104. The frame decimation block thereby generates message data coded in the message data format. The controller 115 then stores the message data as a stored voice message in the memory 116. Accordingly, the user may choose to store either a voice message by speaking through the microphone or a voice message received by means of the receiver of the communication device.

Figure 4:
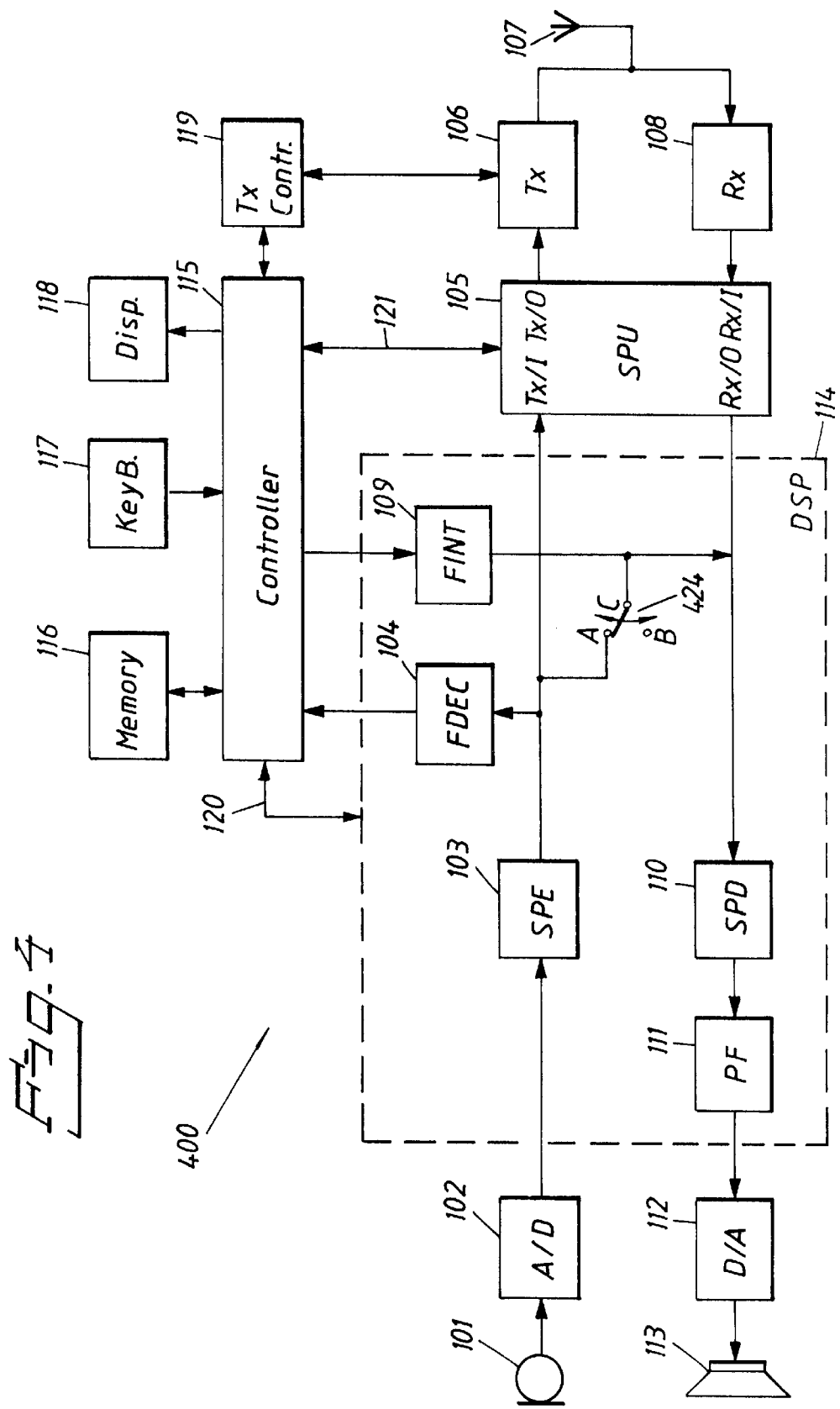
FIG. 4 illustrates an exemplary block diagram of a communication device in accordance with a fourth embodiment of the present invention.

FIG. 4 illustrates an exemplary block diagram of a communication device 400 in accordance with a fourth embodiment of the present invention. The fourth embodiment of the present invention differs from the first embodiment discussed above in that a switch 424 is introduced. The switch 424 has a first terminal, A, connected to the output of the speech encoder 103, a second terminal, B, not connected at all and a common terminal, C, connected to the output of the frame interpolation block 109. The switch may either connect terminal A or terminal B to terminal C upon control by the controller 115.

The operation of the fourth embodiment is identical to the operation of the first embodiment when the switch 424 does not connect the output of the frame interpolation block 109 to the transmitter input, Tx/I, of the signal processing unit 105 (terminal B connected to terminal C). In the case when the switch 424 does connect the output of the frame interpolation block 109 to the transmitter input, Tx/I, of the signal processing unit 105 (terminal A connected to terminal C) the user has the possibility to retrieve a stored voice message and transmit it by means of the transmitter 106. In this case message data corresponding to a stored voice message is read out from the memory 116 by the controller 115 and forwarded to the frame interpolation block 109. An encoded voice signal is generated at the output of the frame interpolation block 109 and this signal will also appear on the transmitter input, Tx/I of the signal processing unit 105 due to the switch 424. After processing by the signal processing unit the voice message is transmitted by means of the transmitter 106. Accordingly, the user may choose to retrieve a stored voice message and either just having it replayed through the loudspeaker or in addition having it sent by means of the transmitter.

Several other embodiments (not shown) are conceivable. For example, message data corresponding to a number of stored voice messages may be unalterably pre-stored in the memory. These messages may then be outputted by means of the loudspeaker or by means of the transmitter at the command of the user or initiated by the controller. For example, the controller may respond to a particular operational status of the communication device by outputting a stored voice message to the user through the loudspeaker. In another example, the communication device may operate in a manner similar to an automatic answering machine. Assuming that there is an incoming call to the communication device and the user does not answer or does not want to answer, a stored voice message may then be read out from the memory under the control of the controller and transmitted to the calling party by means of the transmitter. The calling party is informed by the outputted stored voice message that the user is unable to answer the call and that the user may leave a voice message. If the calling party chooses to leave a voice message, the voice message is received by the receiver, compressed by the frame decimation block and eventually stored in the memory by means of the controller. The user may later replay the stored message which was placed by the calling party by reading out the stored voice message from the memory and outputting it by means of the loudspeaker.

The communication devices 100, 200 300 and 400 discussed above may, for example, be a mobile phone or a cellular phone. A duplex filter may be introduced for connecting the antenna 107 with the output of the transmitter 106 and the input of the receiver 108. The present invention is not limited to radio communication devices but may also be used for wired communication devices having a fixed-line connection. Moreover, the user may give commands to the communication device 100, 200, 300, 400 by voice commands instead of, or in addition to, using the keyboard 117.

The frame decimation block 104 may more generally be labeled a code compression means and any algorithm performing compression may be used. Both algorithms introducing distortion, e.g. the methods described above, and algorithms being able to recreate the original signal completely, such as Ziv-Lempel or Huffman, can be used. The Ziv-Lempel algorithm and the Huffman algorithm are discussed in "Elements of Information Theory" by Thomas M. Cover, pp. 319- and pp. 92, respectively, which descriptions are hereby incorporated by reference. Likewise, the frame interpolation block, FINT, 109 may more generally be labeled a code decompression means which algorithm substantially carries out the inverse operation to the algorithm used by the code compression means.

It should be noted that the term "communication device" of the present invention may refer to a hands-free equipment adapted to operate with another communication device, such as a mobile phone or a cellular phone. Furthermore, the elements of the present invention may be realized in different physical devices. For example, the frame interpolation block, FINT, 109 and/or the frame decimation block, FDB, 104 may equally well be implemented in an accessory to a cellular phone as in the cellular phone itself. Examples of such accessories are hands-free equipment and expansion units. An expansion unit may be connected to a system-bus connector of the cellular phone and may thereby provide message storing functions, such as dictating machine functions or answering machine functions.

The construction and method of operation of the present invention achieve the advantage that a voice message is stored in the memory in a more compressed format than the format provided by a speech encoder. Such a stored voice message is decompressed by the decompression means to recreate an encoded voice signal in accordance with the speech encoding format, i.e. the format provided after a voice signal has passed a speech encoder.

Since a stored voice message is stored in the memory in a more compressed format than the format provided by a speech encoder, as is the case in the prior art, less memory is required to store a particular voice message. A smaller memory can therefore be used. Alternatively, a longer voice message can be stored in a particular memory. Consequently, the communication device of the present invention requires less memory and, hence, is cheaper to implement. In, for example, small hand-held communication devices, where memory is a scarce resource, the smaller amount of memory required provides obvious advantages. Furthermore, a small amount of computational power is required due to the fact that simple decompression algorithms can be used by the decompression means.

although preferred embodiments of the system and apparatus of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. An apparatus, comprising:
   a controller;
   a speech encoder for encoding a signal in accordance with a speech encoding format;
   a code compression unit, coupled to said controller, for compressing the encoded signal in accordance with a data compression algorithm;

a memory, coupled to an output of said code compression unit, for storing the compressed encoded signal; and a switch selectively controlled by said controller to enable an encoded signal received by a receiver to be compressed by said code compression unit and stored in said memory.

2. The apparatus according to claim 1, further comprising:

a code decompression unit, coupled to said controller, for decompressing the stored signal; and a speech decoder, coupled to said code decompression unit, for decoding the decompressed signal.

3. The apparatus according to claim 2, further comprising a switch selectively controlled by said controller to enable the stored signal to be decompressed by said decompression unit and outputted from a transceiver.

4. The apparatus according to claim 2, further comprising an operator interface unit for controlling said controller.

5. The apparatus according to claim 2, wherein said code compression unit further includes means for executing a compression operation, and said code decompression unit further includes means for executing a decompression operation.

6. The apparatus according to claim 5, wherein said compression operation and said decompression operation further includes one of a Ziv-Lempel algorithm or a Huffman algorithm.

7. The apparatus according to claim 2, wherein said code compression unit further includes means for eliminating a predetermined number of data frames from the encoded signal.

8. The apparatus according to claim 7, wherein said code decompression unit further includes means for replacing the eliminated data frames using a linear interpolation operation.

9. The apparatus according to claim 2, wherein said encoded signal comprises a plurality of data frames and said code compression unit further includes means for eliminating a plurality of bits having a low priority level from each data frame of the encoded signal.

10. The apparatus according to claim 9, wherein said code decompression unit further includes means for replacing the eliminated plurality of bits using a random code sequence.

11. The apparatus according to claim 10, Wherein said random code sequence is generated from a random code generator or a stored list of pseudo-random sequences.

12. A mobile phone, comprising:

a controller;

a microphone for receiving a signal;

a speech encoder for encoding the received signal in accordance with a speech encoding format, wherein the encoded signal comprises a plurality of data frames;

a code compression unit, coupled to said controller, for compressing the encoded signal by eliminating a plurality of bits having a low priority level from at least one of the plurality of data frames of the encoded signal;

a memory, coupled to an output of said code compression unit, for storing the compressed encoded signal; and a switch selectively controlled by said controller to enable an encoded signal received by a receiver to be compressed by said code compression unit and stored in said memory.

13. The mobile phone according to claim 12, further comprising:

a code decompression unit, coupled to said controller, for decompressing the stored signal;

a speech decoder, coupled to said code decompression unit, for decoding the decompressed signal; and a speaker, coupled to said speech decoder, for outputting the decoded signal.

14. The mobile phone according to claim 13, further comprising a switch selectively controlled by said controller to enable the stored signal to be decompressed by said decompression unit and outputted from a transceiver.

15. The mobile phone according to claim 13, further comprising an operator interface unit for controlling said controller.

16. The mobile phone according to claim 13, wherein said code decompression unit further includes means for replacing the eliminated plurality of bits using a random code sequence.

17. The mobile phone according to claim 16, wherein said random code sequence is generated from a random code generator or a stored list of pseudo-random sequences.

18. A method, comprising the steps of:

converting a signal to a digital signal;

encoding said digital signal in accordance with a speech encoding format;

compressing the encoded signal in accordance with a data compression algorithm;

storing the compressed encoded signal;

decompressing the stored signal by replacing an eliminated set of data using a random code sequence generated by using a random code generator or using a stored list of pseudo-random sequences.

decoding the decompressed signal; and outputting the decoded signal.

19. The method according to claim 18, wherein said step of decompressing further includes replacing eliminated data frames using a linear interpolation method.

20. The method according to claim 18, further comprising the steps of:

decompressing the stored signal; and transmitting the decompressed signal from a transmitter.

21. The method according to claim 18, wherein said step of compressing further includes eliminating a predetermined number of data frames from the encoded signal.

22. The method according to claim 18, wherein said encoded signal comprises a plurality of data frames and said step of compressing further includes eliminating a plurality of bits having a low priority level from each of the plurality of data frames of the encoded signal.

23. The method according to claim 18, wherein said step of compressing further includes executing a Ziv-Lempel algorithm or a Huffman algorithm.

24. The method according to claim 18, further comprising the steps of:

receiving an encoded signal from a receiver;

compressing the received signal; and storing the compressed received signal.

25. An apparatus, comprising:

a receiver for receiving an encoded speech signal, said encoded speech signal encoded according to a speech encoding format;

a compression unit, coupled to said receiver, for compressing said encoded speech signal;

a memory unit, coupled to said compression unit, for storing the compressed speech encoded signal, the compressed speech encoded signal compressed according to a message data format; and a switch to enable an encoded signal received by said receiver to be compressed by said compression unit and stored in said memory.

26. The apparatus of claim 25, further comprising:
a decompression unit, coupled to said memory unit, for decompressing the compressed speech encoded signal to recover said speech encoded signal;
a speech decoder, coupled to said decompression unit, for decoding said speech encoded signal; and
a speaker, coupled to said speech decoder, for outputting the decoded signal.

27. An apparatus, comprising:
a controller;
a speech encoder for encoding a signal;
a code compression unit, coupled to said controller, for compressing the encoded signal;
a memory, coupled to an output of said code compression unit, for storing the compressed encoded signal;
a code decompression unit, coupled to said controller, for decompressing the stored signal;
a speech decoder, coupled to said code decompression unit, for decoding the decompressed signal; and
a switch selectively controlled by said controller to enable an encoded signal received by a receiver to be compressed by said code compression unit and stored in said memory.

28. An apparatus, comprising:
a controller;
a speech encoder for encoding a signal;
a code compression unit, coupled to said controller, for compressing the encoded signal;
a memory, coupled to an output of said code compression unit, for storing the compressed encoded signal;
a code decompression unit, coupled to said controller, for decompressing the stored signal;
a speech decoder, coupled to said code decompression unit, for decoding the decompressed signal; and
a switch selectively controlled by said controller to enable the stored signal to be decompressed by said decompression unit and outputted from a transceiver.

29. An apparatus, comprising:
a controller;
a speech encoder for encoding a signal;
a code compression unit, coupled to said controller, for compressing the encoded signal, said code compression unit further including means for eliminating a set of data having a low priority level from the encoded signal;
a memory, coupled to an output of said code compression unit, for storing the compressed encoded signal;
a code decompression unit, coupled to said controller, for decompressing the stored signal, said code decompression unit further including means for replacing the eliminated set of data using a random code sequence; and
a speech decoder, coupled to said code decompression unit, for decoding the decompressed signal.

30. The apparatus according to claim 29, wherein said random code sequence is generated from a random code generator or a stored list of pseudo-random sequences.

31. A mobile phone, comprising:
a controller;
a microphone for receiving a signal;
a speech encoder for encoding the received signal;
a code compression unit, coupled to said controller, for compressing the encoded signal by eliminating a set of data having a low priority level from the encoded signal;
a memory, coupled to an output of said code compression unit, for storing the compressed encoded signal;
a code decompression unit, coupled to said controller, for decompressing the stored signal;
a speech decoder, coupled to said code decompression unit, for decoding the decompressed signal;
a speaker, coupled to said speech decoder, for outputting the decoded signal; and
a switch selectively controlled by said controller to enable an encoded signal received by a receiver to be compressed by said code compression unit and stored in said memory.

32. A mobile phone, comprising:
a controller;
a microphone for receiving a signal;
a speech encoder for encoding the received signal;
a code compression unit, coupled to said controller, for compressing the encoded signal by eliminating a set of data having a low priority level from the encoded signal;
a memory, coupled to an output of said code compression unit, for storing the compressed encoded signal;
a code decompression unit, coupled to said controller, for decompressing the stored signal;
a speech decoder, coupled to said code decompression unit, for decoding the decompressed signal;
a speaker, coupled to said speech decoder, for outputting the decoded signal; and
a switch selectively controlled by said controller to enable the stored signal to be decompressed by said decompression unit and outputted from a transceiver.

33. A mobile phone, comprising:
a controller;
a microphone for receiving a signal;
a speech encoder for encoding the received signal;
a code compression unit, coupled to said controller, for compressing the encoded signal by eliminating a set of data having a low priority level from the encoded signal;
a memory, coupled to an output of said code compression unit, for storing the compressed encoded signal;
a code decompression unit, coupled to said controller, for decompressing the stored signal by replacing the eliminated set of data using a random code sequence;
a speech decoder, coupled to said code decompression unit, for decoding the decompressed signal; and
a speaker, coupled to said speech decoder, for outputting the decoded signal.

34. The mobile phone according to claim 33, wherein said random code sequence is generated from a random code generator or a stored list of pseudo-random sequences.

35. A method, comprising the steps of:
converting a signal to a digital signal;
encoding said digital signal;
compressing the encoded signal;
storing the compressed encoded signal;
decompressing the stored signal by replacing an eliminated set of data using a random code sequence;

decoding the decompressed signal; and outputting the decoded signal.

36. The method according to claim 35, further comprising the step of generating the random code sequence using a random code generator or using a stored list of pseudo-random sequences.

* * * * *